US011533787B2

(12) United States Patent
Moon et al.

(10) Patent No.: US 11,533,787 B2
(45) Date of Patent: Dec. 20, 2022

(54) INDUCTION HEATING AND WIRELESS POWER TRANSFERRING DEVICE HAVING IMPROVED TARGET OBJECT DETECTION ALGORITHM

(71) Applicant: LG Electronics Inc., Seoul (KR)

(72) Inventors: Hyunwook Moon, Seoul (KR); Eui Sung Kim, Seoul (KR); Byeong Wook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 663 days.

(21) Appl. No.: 16/145,298

(22) Filed: Sep. 28, 2018

(65) Prior Publication Data

US 2019/0104569 A1 Apr. 4, 2019

(30) Foreign Application Priority Data

Sep. 29, 2017 (KR) ........................ 10-2017-0128283

(51) Int. Cl.
*H05B 6/04* (2006.01)
*H02J 50/12* (2016.01)
(Continued)

(52) U.S. Cl.
CPC ................ *H05B 6/04* (2013.01); *H02J 50/12* (2016.02); *H02M 1/088* (2013.01); *H02M 1/44* (2013.01);
(Continued)

(58) Field of Classification Search
CPC .. H05B 6/065; H05B 6/1272; H05B 2213/05; H05B 6/1263; H05B 6/062; H05B 6/04;
(Continued)

(56) References Cited

U.S. PATENT DOCUMENTS 5,250,777 A * 10/1993 Fishman ............... F27B 14/061
219/619
2011/0192835 A1* 8/2011 Lee .......................... H05B 6/12
219/621
(Continued)

FOREIGN PATENT DOCUMENTS

EP 2209350 7/2010
EP 2395813 12/2011
(Continued)

OTHER PUBLICATIONS

English translation of KR-20160139380-A (Year: 2016).*
Extended European Search Report in European Appln. No. 18196255. 6, dated Feb. 15, 2019, 7 pages.

*Primary Examiner* — Chris Q Liu
(74) *Attorney, Agent, or Firm* — Fish & Richardson P.C.

(57) ABSTRACT

An induction heating and wireless power transferring device that includes: a first working coil and a second working coil that are coupled in parallel; a rectification unit configured to rectify alternating current (AC) power to direct current (DC) power; a first inverter unit configured to convert the DC power into resonant current, and apply the converted resonant current to the first working coil or the second working coil; a first switch coupled to the first working coil and configured to turn on or off the first working coil; a second switch coupled to the second working coil and configured to turn on or off the second working coil; and a control unit configured to control the first inverter unit, the first switch, or the second switch to detect whether a target object is located on the first working coil or the second working coil.

20 Claims, 10 Drawing Sheets

(51) Int. Cl.
*H02M 7/537* (2006.01)
*H02M 1/44* (2007.01)
*H05B 6/06* (2006.01)
*H02M 1/088* (2006.01)
*H05B 6/12* (2006.01)
*H02M 7/48* (2007.01)

(52) U.S. Cl.
CPC ............ *H02M 7/537* (2013.01); *H05B 6/062* (2013.01); *H05B 6/1245* (2013.01); *H02M 7/4815* (2021.05); *H05B 2213/03* (2013.01); *H05B 2213/05* (2013.01)

(58) Field of Classification Search
CPC .... H05B 6/1245; H05B 6/44; H05B 2213/06; H02M 7/537
USPC ....... 219/626, 624, 662, 664, 620, 661, 621, 219/660, 663, 671; 363/96, 153
See application file for complete search history.

(56) References Cited

U.S. PATENT DOCUMENTS

| | | | | |
|---|---|---|---|---|
| 2011/0303653 | A1* | 12/2011 | Chun | H05B 6/062 219/624 |
| 2012/0152935 | A1* | 6/2012 | Kitaizumi | H05B 6/065 219/661 |
| 2012/0305546 | A1* | 12/2012 | Filippa | H05B 6/062 219/660 |
| 2013/0334212 | A1* | 12/2013 | Sawada | H02M 5/458 219/662 |
| 2014/0144902 | A1* | 5/2014 | Oh | H05B 6/065 219/620 |
| 2016/0374151 | A1* | 12/2016 | Ok | H05B 6/1236 |

FOREIGN PATENT DOCUMENTS

| | | |
|---|---|---|
| KR | 10-0204886 B1 | 6/1999 |
| KR | 10-2011-0136226 A | 12/2011 |
| KR | 20160139380 A * | 12/2016 |
| WO | WO2010069825 | 6/2010 |

* cited by examiner

INDUCTION HEATING AND WIRELESS POWER TRANSFERRING DEVICE HAVING IMPROVED TARGET OBJECT DETECTION ALGORITHM

CROSS-REFERENCE TO RELATED APPLICATION

This application claims priority to and the benefit of Korean Application No. 10-2017-0128283 filed on Sep. 29, 2017, the entire contents of which are incorporated herein by reference.

BACKGROUND

This application relates to an induction heating and wireless power transferring device having an improved target object detection algorithm.

Various types of cooking utensils are being used to heat food in homes and restaurants. Conventionally, gas ranges using gas as a fuel have come into wide use. However, recently, devices for heating an object to be heated such as, e.g., a cooking pot, using electricity without using gas have come into use.

A method of heating an object to be heated using electricity is divided into a resistance heating method and an induction heating method. An electric resistance method is a method of heating an object by transferring heat generated when a current is passed through a metal-resistant wire or a non-metallic heating element such as silicon carbide to an object to be heated through radiation or conduction. The induction heating method is a method of generating an eddy current in an object to be heated (for example, a cooking container) that is made of a metal component by using a magnetic field generated around a coil when a predetermined magnitude of high-frequency power is applied to the coil so that the object to be heated itself is heated.

SUMMARY

Recently, technology for supplying power in a wireless manner has been developed and applied to many electronic devices. The electronic devices with wireless power transferring technology are charged by simply placing them on a charging pad without connecting them to a charging connector. The electronic devices with the wireless power transferring technology do not require a cord or a charger, thereby improving portability and reducing a size and weight in comparison to a conventional electronic device.

The wireless power transferring technology mainly includes an electromagnetic induction method using a coil, a resonance method using resonance, and a radio wave radiation method in which electrical energy is converted into a microwave and transferred. Among them, the electromagnetic induction method is a technology of transferring electric power by using electromagnetic induction between a primary coil provided in a device for transferring wireless power and a secondary coil provided in a device for receiving wireless power.

The induction heating method of the induction heating device as described above has substantially the same principle as the wireless power transferring technology using electromagnetic induction in that an object to be heated is heated by means of electromagnetic induction.

Accordingly, research and development of an induction heating and wireless power transferring device capable of selectively performing induction heating and wireless power transferring based on a user's needs have been actively conducted.

In order to heat each of a plurality of target objects (e.g., a cooking container) or to transfer power in a wireless manner to each of a plurality of target objects (e.g., a wireless power receiving device), the induction heating and wireless power transferring device is generally provided with working coils in corresponding regions, respectively, However, recently, an induction heating and wireless power transferring device (i.e., a zone free type induction heating and wireless power transferring device) in which a single target object is simultaneously heated by a plurality of working coils, or power is simultaneously transferred to the single target object in a wireless manner through the plurality of working coils has been widely used.

In the zone free type induction heating and wireless power transferring device, a target object may be inductively heated or power may be transferred to the target object in a wireless manner regardless of a size and a location of the target object within a region where the plurality of working coils are present.

FIG. 1 illustrates an example of a conventional induction heating and wireless power transferring device.

As illustrated in FIG. 1, a conventional zone free type induction heating and wireless power transferring device 10 has a structure in which individual relays R1 to R8 (for example, a three-terminal relay) are respectively connected to a plurality of working coils WC1-WC8 in order to independently distinguish the plurality of working coils WC1-WC8 from one another and perform a circuit switching operation for detection of a target object. However, this structure has a problem that a noise is generated during the switching operation of the relays R1 to R8.

Further, when the target object is located over different working coil groups (for example, first and second working coils WC1 and WC2 and fifth and sixth working coils WC5 and WC6), first and second group relays 35 and 40 have to be switched so that both of them are connected to a first inverter unit 25 or a second inverter unit 30 for synchronization control of the first and second working coils WC1 and WC2 and the fifth and sixth working coils WC5 and WC6. However, in this case, there is also a problem that a noise is generated by the switching operation of the group relays.

In addition, there is a problem that a volume of a circuit becomes large because the group relays 35 and 40, the individual relays R1 to R8, and a target object detection circuit 45 provided to detect the target object occupies a large portion of an area of the circuit.

To solve the problem, in some implementations, an induction heating and wireless power transferring device can operate an improved target object detection algorithm. In some implementations, an induction heating and wireless power transferring device can reduce a volume of a circuit and solving a noise problem occurring when a relay switching operation is performed by removing a relay and target object detection circuit.

Particular implementations of the subject matter described in this specification can be implemented so as to realize one or more of the following advantages. The induction heating and wireless power transferring device may include a control unit that controls respective operations of an inverter unit and a semiconductor switch to detect a working coil on which a target object is located at a time point at which a resonant current becomes zero, thereby improving a target object detection algorithm.

Further, the induction heating and wireless power transferring device according to this application may perform a target object detecting operation and an output control operation by using the semiconductor switch and the control unit instead of the relay and the target object detection circuit, thereby solving a noise problem occurring when the relay switching operation is performed.

The induction heating and wireless power transferring device according to this application may independently distinguish the plurality of working coils from one another through the semiconductor switch and the control unit, and may turn on or off the working coils at high speed, thereby improving target object detection speed and algorithm. Further, the induction heating and wireless power transferring device may perform a target object detecting operation at a time point when a resonant current becomes zero, thereby minimizing an influence of the target object detecting operation on an output of the device. Furthermore, the induction heating and wireless power transferring device may continuously perform the target object detecting operation not only before the working coil is driven by the inverter unit but also during the driving of the working coil, thereby improving target object detection reliability.

Also, the induction heating and wireless power transferring device according to this application may perform the target object detecting operation by using the semiconductor switch and the control unit instead of the relay and target object detection circuit, thereby solving a noise problem occurring when the switching operation of the relay is performed. As a result, it is possible to improve user satisfaction. Further, the induction heating and wireless power transferring device according to this application may improve ease of use because a user may use the induction heating and wireless power transferring device quietly during noise-sensitive time zones (for example, at dawn or late at night). In addition, the induction heating and wireless power transferring device according to this application may reduce the volume of the circuit by removing the relay and the target object detection circuit that occupies a large portion of the area of the circuit, thereby reducing an overall volume of the induction heating and wireless power transferring device. As a result, it is possible to improve space utilization. In addition to the advantages described above, other advantages are described below with reference to relevant figures.

In general, one innovative aspect of the subject matter described in this specification can be implemented in an induction heating and wireless power transferring device including: a first working coil unit that includes a first working coil and a second working coil that are coupled in parallel; a rectification unit that is configured to rectify alternating current (AC) power supplied from a power supply unit to direct current (DC) power; a first inverter unit that is configured to (i) receive the DC power from the rectification unit, (ii) convert the DC power into resonant current, and (iii) apply the converted resonant current to at least one of the first working coil or the second working coil; a first switch that is coupled to the first working coil and that is configured to turn on or off the first working coil; a second switch that is coupled to the second working coil and that is configured to turn on or off the second working coil; and a control unit that is configured to control at least one of the first inverter unit, the first switch, or the second switch to detect whether a target object is located on the first working coil or the second working coil.

The foregoing and other implementations can each optionally include one or more of the following features, alone or in combination. In particular, one implementation includes all the following features in combination. The control unit is configured to: supply one or more pulses to the first inverter unit at one or more time points to detect whether the target object is located on the first working coil or the second working coil, wherein the resonant current becomes zero at the one or more time points. The control unit is configured to: turn on or off the first switch or the second switch sequentially and repeatedly until detection of whether the target object is located on the first working coil or the second working coil is complete. The control unit is configured to supply the one or more pulses while the first switch or the second switch is turned on. The control unit is configured to: turn on the first switch at a first time point, and supply a first pulse to the first inverter unit based on the resonant current becoming zero after the first time point, in a state in which a target object is not detected before a second time point that is a predetermined cycle after the first time point, turn off the first switch and turn on the second switch at the second time point, and supply a second pulse to the first inverter based on the resonant current becoming zero after the second time point. The control unit is configured to: at a third time point and based on a determination that the target object is not detected before the third time point, turn off the second switch and turn on the first switch, the third time point being the predetermined cycle after the second time point, and supply a third pulse to the first inverter unit based on the resonant current becoming zero after the third time point. The control unit is configured to: based on the target object being detected on the first working coil, supply a switching signal to the first inverter unit, wherein a frequency and a phase of the switching signal are adjusted based on power level input received from a user, and turn on or off the first switch based on the switching signal. The control unit is configured to: stop supplying the switching signal to the first inverter unit at a time point at which the resonant current becomes zero, after stopping the supply of the switching signal, determine whether the target object remains on the first working coil before a start of a predetermined time period for detecting whether another target object other than the target object is located on the second working coil, at the start of the predetermined time period for detecting whether another target object other than the target object is located on the second working coil, turn off the first switch and turn on the second switch, and supply a pulse to the first inverter unit at a time point when the resonant current becomes zero during the predetermined time period. The control unit is configured to: turn off the first switch and turn on the second switch simultaneously. The control unit is configured to: based on another target object not being detected on the second working coil during the predetermined time period, turn off the second switch and turn on the first switch at an end of the predetermined period of time, and supply the switching signal to the first inverter unit. The control unit is configured to: detect an attenuation degree of resonant current flowing through at least one of the first working coil or the second working coil, and based on the detected attenuation degree of the resonant current, determine whether the target object is located on the first working coil or the second working coil. The induction heating and wireless power transferring device further includes: a second working coil unit that includes a third working coil and a fourth working coil that are coupled in parallel; a second inverter unit that is configured to (i) receive the DC power from the rectification unit, (ii) convert the DC power into resonant current, and (iii) apply the converted resonant current to at least one of the third working coil or the fourth working coil; a third switch that is coupled to the third working coil and that is configured to turn on or off the third working coil; and a fourth switch that is coupled to the fourth working coil and that is configured to turn on or off the fourth working coil, wherein the control unit is configured to: control at least one of the first inverter unit, the second inverter unit, the first switch, the second switch, the third switch, or the fourth switch to synchronize the resonant current converted by the first inverter unit and the resonant current converted by the second inverter unit, and control at least one of the first inverter unit, the second inverter unit, the first switch, the second switch, the third switch, or the fourth switch to detect whether a target object is located on the first working coil, the second working coil, the third working coil, or the fourth working coil based on the synchronized resonant current becoming zero. The control unit is configured to: turn on the first switch and the third switch at a first time point, supply respective first pulses to the first inverter unit and the second inverter unit based on the synchronized resonant current becoming zero after the first time point, and at a second time point and based on the target object not being detected on the first working coil or the third working coil before the second time point that is a predetermined cycle after the first time point, turn off the first switch and the third switch and turn on the second switch and the fourth switch, and supply respective second pulses to the first inverter unit and the second inverter unit at a time point at which the synchronized resonant current becomes zero. The control unit is configured to: at a third time point and based on the target object not being detected on the second working coil or the fourth working coil before the third time point, turn off the second switch and the fourth switch and turn on the first switch and the third switch, the third time point being the predetermined cycle after the second time point, and supply respective third pulses to the first inverter unit and the second inverter unit based on the synchronized resonant current becoming zero after the third time point. The first switch is a semiconductor switch. The second switch is a semiconductor switch. The third switch is a semiconductor switch. The fourth switch is a semiconductor switch. The induction heating and wireless power transferring device further includes: a filter unit that is configured to remove an AC component of the DC power received from the rectification unit. The filter unit includes one or more capacitors.

BRIEF DESCRIPTION OF THE DRAWINGS

Like reference numbers and designations in the various drawings indicate like elements.

DETAILED DESCRIPTION

Hereinafter, an induction heating and wireless power transferring device is described in greater detail.

Figure 1:
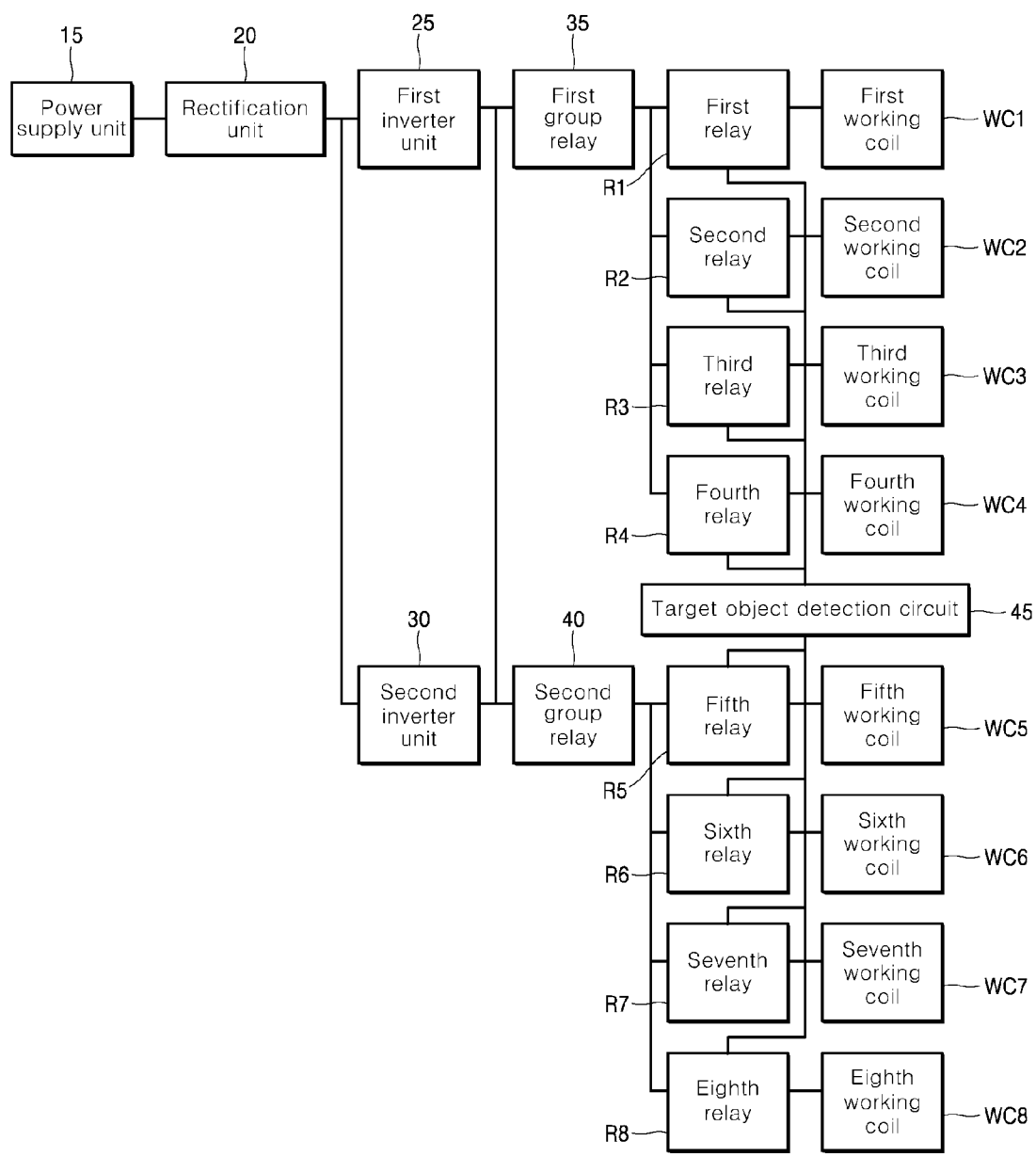
FIG. 1 is a diagram illustrating an example of a conventional zone free type induction heating and wireless power transferring device.
Figure 2:
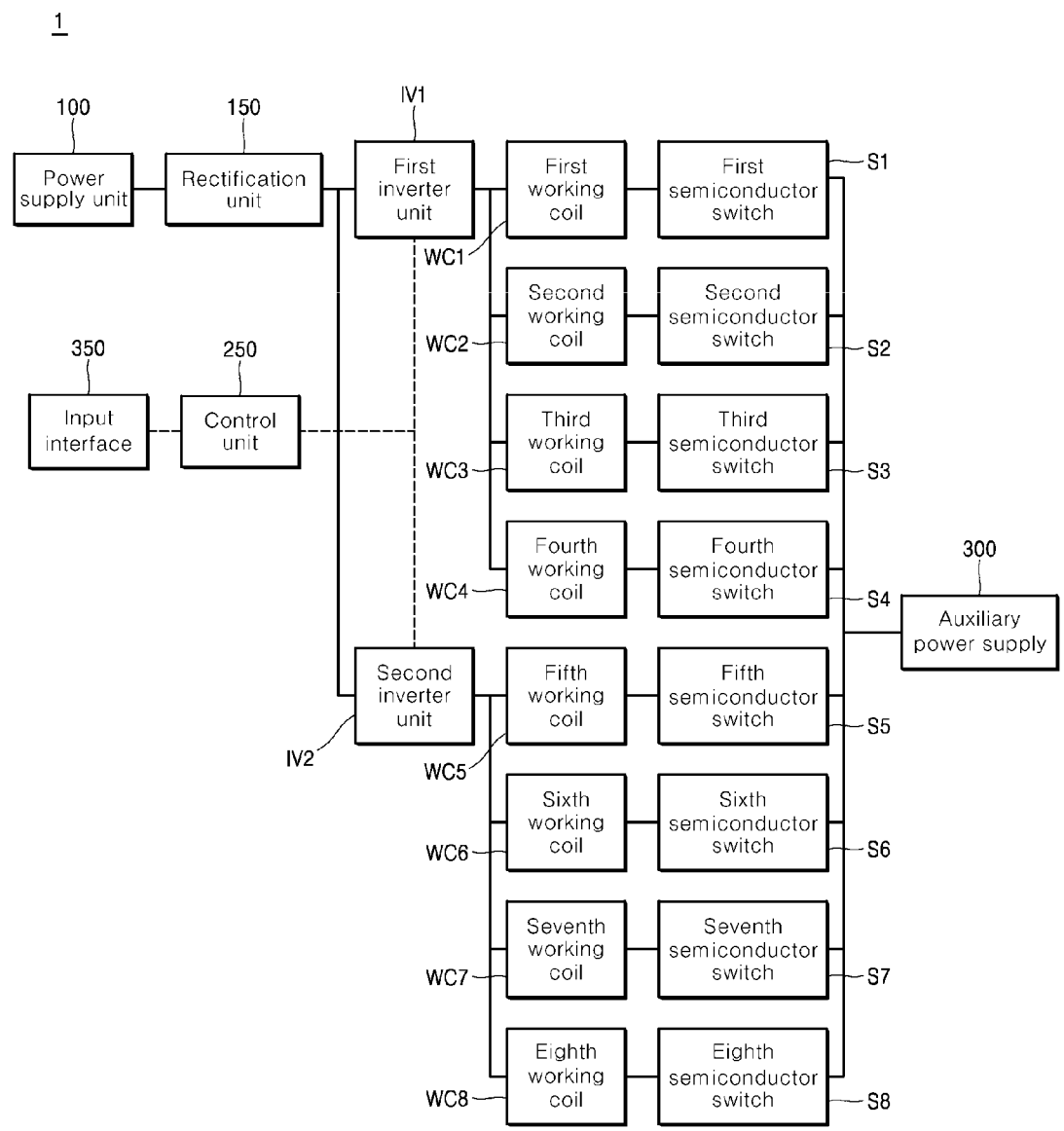
FIG. 2 is a diagram illustrating an example induction heating and wireless power transferring device.

FIG. 2 illustrates an example induction heating and wireless power transferring device. Referring to FIG. 2, an induction heating and wireless power transferring device 1 includes a power supply unit 100, a rectification unit 150, first and second inverter units IV1 and IV2, a control unit 250, first to eighth working coils WC1-WC8, first to eighth switches 51-58, an auxiliary power supply 300, and an input interface 350. In some implementations, the switches S1-S8 can be semiconductor switches.

In some implementations, the induction heating and wireless power transferring device 1 may include only the first and fifth working coils WC1 and WC5 among the first to eighth working coils WC1-WC8, and may include only the first and fifth semiconductor switches S1 and S5 among the first to eighth semiconductor switches S1-S8.

In this case, the induction heating and wireless power transferring device 1 may have a structure in which only the first working coil WC1 is driven by the first inverter unit IV1, and only the fifth working coil WC5 is driven by the second inverter unit IV2. But, for ease of explanation, a configuration in which the induction heating and wireless power transferring device 1 includes the first to eighth working coils WC1-WC8 and the first to eighth semiconductor switches 51-58 will be described as an example in exemplary implementations of this application.

The power supply unit 100 may output alternating current (AC) power.

Specifically, the power supply unit 100 may output AC power and supply the AC power to the rectification unit 150, and may be, for example, a commercial power source.

The rectification unit 150 may convert the AC power supplied from the power supply unit 100 into direct current (DC) power and supply the DC power to at least one of the first inverter unit IV1 and the second inverter unit IV2.

Specifically, the rectification unit 150 may rectify the AC power supplied from the power supply unit 100 and convert the rectified AC power into DC power.

In some implementations, the DC power rectified by the rectification unit 150 may be supplied to a filter unit that can include one or more capacitors, and the filter unit may remove an AC component remaining in the corresponding DC power. For example, the DC power rectified by the rectification unit 150 may be supplied as a DC link capacitor (e.g., a smoothing capacitor), and the DC link capacitor may reduce ripple of the corresponding DC power.

Thus, the DC power rectified by the rectification unit 150 and the filter unit (or the DC link capacitor) may be supplied to at least one of the first and second inverter units IV1 and IV2.

The first inverter unit IV1 may perform a switching operation to apply a resonant current to at least one of the first to fourth working coils WC1-WC4.

Specifically, the switching operation of the first inverter unit IV1 may be controlled by the control unit 250. That is, the first inverter unit IV1 may perform the switching operation based on a switching signal supplied from the control unit 250.

In some implementations, the first inverter unit IV1 may include two switching elements, and the two switching elements may be alternately turned on and off by the switching signal supplied from the control unit 250.

Further, the switching operation of these two switching elements may generate a high-frequency AC (i.e., a resonant current), and the generated high-frequency AC may be applied to at least one of the first to fourth working coils WC1-WC4.

In the same manner, the second inverter unit IV2 may perform a switching operation to apply a resonant current to at least one of the fifth to eighth working coils WC5-WC8.

Specifically, the switching operation of the second inverter unit IV2 may be controlled by the control unit 250. That is, the second inverter unit IV2 may perform the switching operation based on a switching signal supplied from the control unit 250.

In some implementations, the second inverter unit IV2 may include two switching elements, and the two switching elements may be alternately turned on and off by the switching signal supplied from the control unit 250.

Further, the switching operation of these two switching elements may generate a high-frequency AC (i.e., a resonant current), and the generated high-frequency AC may be applied to at least one of the fifth to eighth working coils WC5-WC8.

The control unit 250 may control respective operations of the first and second inverter units IV1 and IV2 and the first to eighth semiconductor switches S1-S8.

Specifically, the switching operations of the first and second inverter units IV1 and IV2 may be controlled in response to the switching signal of the control unit 250, and the first to eighth semiconductor switches S1-S8 may be turned on or off in a sequential order, in a particular order, or simultaneously in response to a control signal of the control unit 250.

For example, when the first inverter unit IV1 is driven by the switching signal of the control unit 250 and the first semiconductor switch S1 is turned on by the control signal of the control unit 250, a resonant current may be applied to the first working coil WC1.

Thus, an object, e.g., a target object, that is located on the first working coil WC1 may be heated, or electric power may be transferred to the target object in a wireless manner by the resonant current applied to the first working coil WC1.

In some implementations, the control unit 250 may generate various switching signals or control signals via a pulse width modulation (PWM) function.

Further, the control unit 250 may control a driving mode of the induction heating and wireless power transferring device 1, i.e., an induction heating mode or a wireless power transferring mode.

That is, when the driving mode of the induction heating and the wireless power transferring device 1 is set to the wireless power transferring mode by the control unit 250, at least one of the first to eighth working coils WC1-WC8 may be driven to transfer power to a target object in a wireless manner.

On the other hand, when the driving mode of the induction heating and the wireless power transferring device 1 is set to the induction heating mode by the control unit 250, at least one of the first to eighth working coils WC1-WC8 may be driven to heat the target object.

Further, the control unit 250 may determine the number of working coils to be driven, and a transferred power amount or a heating intensity of the induction heating and wireless power transferring device 1 may vary depending on the number of working coils to be driven.

And, the control unit 250 may determine a working coil to be driven based on a location of the target object, and may also determine whether or not the switching signal between the working coils to be driven is synchronized.

And, the control unit 250 may detect a resonant current flowing through the first to eighth working coils WC1-WC8, and may determine a working coil with the target object located thereon among the first to eighth working coils WC1-WC8 based on the detected value.

Also, the control unit 250 may determine whether the target object is a magnetic body or a non-magnetic body based on the detected value.

Specifically, when the target object mounted on the induction heating and wireless power transferring device 1 is a magnetic body, a high eddy current may be induced from the working coil and resonated, so that a relatively low resonant current may flows through the working coil. However, when the target object mounted on the induction heating and wireless power transferring device 1 is not present or is a non-magnetic body, the working coil is not resonated, so that a relatively high resonant current may flow through the working coil.

Accordingly, when the resonant current flowing through the working coil is lower than a predetermined reference current, the control unit 250 may determine that the target object is a magnetic body. Conversely, when the amount of resonant current flowing through the working coil is equal to or larger than the predetermined reference current amount, the control unit 250 may determine that the target object is a non-magnetic object or is not present.

In some implementations, the induction heating and wireless power transferring device 1 may further include a detection unit to detect a resonant current flowing through the working coil, and the detection unit may perform the above-described target object detection function.

But, for ease of explanation, a configuration in which the control unit 250 performs the target object detection function will be described as an example in exemplary implementations of this application.

The first to fourth working coils WC1-WC4 may be coupled in parallel to one another. In some implementations, one or more circuit elements can be coupled between two of the working coils WC1-WC4.

Specifically, the first to fourth working coils WC1-WC4 may be coupled in parallel to one another, and may receive a resonant current from the first inverter unit IV1.

That is, when the driving mode of the induction heating and wireless power transferring device 1 is the induction heating mode, the high-frequency AC applied to at least one of the first to fourth working coils WC1-WC4 from the first inverter unit IV1 may generate an eddy current between the corresponding working coil and the target object, and the generated eddy current may heat the target object.

Further, when the driving mode of the induction heating and wireless power transferring device 1 is the wireless power transferring mode, the high-frequency AC applied to at least one of the first to fourth working coils WC1-WC4 from the first inverter unit IV1 may generate a magnetic field in the corresponding working coil. As a result, a current may flow through a coil provided within the target object that corresponds to the corresponding working coil, and the current flowing through the coil provided within the target object may charge the target object.

Further, the first working coil WC1 may be connected to the first semiconductor switch S1, the second working coil WC2 may be connected to the second semiconductor switch S2, the third working coil WC3 may be connected to the third semiconductor switch S3, and the fourth working coil WC4 may be connected to the fourth semiconductor switch S4.

Accordingly, the respective working coils may be turned on or off at high speed by the corresponding semiconductor switches.

The fifth to eighth working coils WC5-WC8 may be connected in parallel to one another.

Specifically, the fifth to eighth working coils WC5-WC8 may be connected in parallel to one another, and may receive a resonant current from the second inverter unit IV1.

That is, when the driving mode of the induction heating and wireless power transferring device 1 is the induction heating mode, the high-frequency AC applied to at least one of the fifth to eighth working coils WC5-WC8 from the second inverter unit IV2 may generate an eddy current between the corresponding working coil and the target object, and the generated eddy current may heat the target object.

Further, when the driving mode of the induction heating and wireless power transferring device 1 is the wireless power transferring mode, the high-frequency AC applied to at least one of the fifth to eighth working coils WC5-WC8 from the second inverter unit IV2 may generate a magnetic field in the corresponding working coil. As a result, a current may flow through a coil provided within the target object that corresponds to the corresponding working coil, and the current flowing through the coil provided within the target object may charge the target object.

Further, the fifth working coil WC5 may be connected to the fifth semiconductor switch S5, the sixth working coil WC6 may be connected to the sixth semiconductor switch S6, the seventh working coil WC7 may be connected to the seventh semiconductor switch S7, and the eighth working coil WC8 may be connected to the eighth semiconductor switch S8.

Accordingly, the respective working coils may be turned on or off at high speed by the corresponding semiconductor switches.

In some implementations, the working coil being turned on or off by the semiconductor switch may mean that the flow of the resonant current applied from the inverter to the working coil is unblocked or blocked by the semiconductor switch.

The first to eighth semiconductor switches S1-S8 may be respectively connected to the first to eighth working coils WC1-WC8 to turn on or off the first to eighth working coils WC1-WC8, and may receive power from the auxiliary power supply 300.

Specifically, the first semiconductor switch S1 may be connected to the first working coil WC1 to turn on or off the first working coil WC1, and the second semiconductor switch S2 may be connected to the second working coil WC2 to turn on or off the second working coil WC2. Also, the third semiconductor switch S3 may be connected to the third working coil WC3 to turn on or off the third working coil WC3, and the fourth semiconductor switch S4 may be connected to the fourth working coil WC4 to turn on or off the fourth working coil WC4.

Further, the first to fourth semiconductor switches S1-S4 may be driven in line with the first inverter unit IV1 by the control unit 250 to detect whether or not the target object is present on the first to fourth working coils WC1-WC4 or to control outputs of the first to fourth working coils WC1-WC4.

The fifth semiconductor switch S5 may be connected to the fifth working coil WC5 to turn on or off the fifth working coil WC5 and the sixth semiconductor switch S6 may be connected to the sixth working coil WC6 to turn on or off the sixth working coil WC6. Also, the seventh semiconductor switch S7 may be connected to the seventh working coil WC7 to turn on or off the seventh working coil WC7, and the eighth semiconductor switch S8 may be connected to the eighth working coil WC8 to turn on or off the eighth working coil WC8.

Further, the fifth to eighth semiconductor switches S5 to S8 may be driven in line with the second inverter unit IV1 by the control unit 250 to detect whether or not the target object is present on the fifth to eighth working coils WC5-WC8 or to control outputs of the fifth to eighth working coils WC5-WC8.

In some implementations, the first to eighth semiconductor switches S1-S8 may include, for example, a static switch. Also, for example, a metal oxide semiconductor field effect transistor (MOSFET) or an insulated gate bipolar mode transistor (IGBT) may be applied to the first to eighth semiconductor switches S1-S8.

The auxiliary power supply 300 may supply power to the first to eighth semiconductor switches S1-S8.

Specifically, the auxiliary power supply 300 may have a single output structure (i.e., one output terminal). Therefore, the auxiliary power supply 300 may supply power to the first to eighth semiconductor switches S1-S8 with a single output. Also, the auxiliary power supply 300 may reduce the number of pins required for connection with the first to eighth semiconductor switches S1 to S8 in comparison to a multiple output structure.

When a single output capacity is too large (that is, when the single output capacity is significantly out of a predetermined reference capacity), the auxiliary power supply 300 may be designed to have a double output structure (a structure in which each output terminal divides the single output capacity into capacities which are less than or equal to the predetermined reference capacity and outputs).

In some implementations, the auxiliary power supply 300 may include, for example, a switched mode power supply (SMPS), but is not limited thereto.

The input interface 350 may receive an input from a user and supply the input to the control unit 250.

Specifically, the input interface 350, which is a module for inputting a heating intensity and a driving time of the induction heating and the wireless power transferring device 1 desired by a user, may be implemented in various ways such as a physical button, a touch panel or the like.

In addition, the input interface 350 may be provided with a power button, a lock button, a power level adjustment button (+, −), a timer adjustment button (+, −), a charge mode button, and the like The input interface 350 may supply the supplied input information to the control unit 250, and the control unit 250 may drive the induction heating and wireless power transferring device 1 in various ways on the basis of the input information supplied from the input interface 350. The following is an example of the induction heating and wireless power transferring device 1 being driven in various ways.

When the user touches the power button provided in the input interface 350 for a certain period of time in a state where the induction heating and wireless power transferring device 1 is not driven, the driving of the induction heating and the wireless power transferring device 1 may be started. Conversely, when the user touches the power button for a certain period of time in a state where the induction heating and wireless power transferring device 1 is driven, the driving of the induction heating and the wireless power transferring device 1 may be terminated.

Further, when the user touches the lock button for a certain period of time, all the other buttons may not be operated. Thereafter, when the user touches the lock button again for a certain period of time, all the other buttons may be operated.

Further, when the user touches the power level adjustment button (+, −) in a state where the power is input, a current power level of the induction heating and wireless power transferring device 1 may be displayed numerically on the input interface 350. Also, by touch of the power level adjustment button (+, −), the control unit 250 may determine that the driving mode of the induction heating and wireless power transferring device 1 is the induction heating mode. The control unit 250 may adjust a frequency for the switching operations of the first and second inverter units IV1 and IV2 to correspond to the input power level.

Further, the user may touch the timer adjustment button (+, −) to set a driving time of the induction heating and wireless power transferring device 1. The control unit 250 may terminate the driving of the induction heating and the wireless power transferring device 1 when the driving time set by the user has elapsed.

At this time, when the induction heating and wireless power transferring device 1 operates in the induction heating mode, the driving time of the induction heating and wireless power transferring device 1 set by the timer adjustment button (+, −) may be a heating time of the target object. Also, when the induction heating and wireless power transferring device 1 operates in the wireless power transferring mode, the driving time of the induction heating and wireless power transferring device 1 set by the timer adjustment button (+, −) may be a charging time of the target object.

When the user touches the charge mode button, the induction heating and wireless power transferring device 1 may be driven in the wireless power transferring mode.

At this time, the control unit 250 may receive device information about the target object through communication with the target object mounted in a driving region (i.e., an upper portion of the working coil). The device information transferred from the target object may include information such as, for example, a type of the target object, a charging mode, and an amount of power required.

Also, the control unit 250 may determine a type of the target object based on the received device information, and may recognize a charging mode of the target object.

In some implementations, the charging mode of the target object may include a normal charging mode and a high speed charging mode.

Accordingly, the control unit 250 may adjust a frequency of at least one of the first and second inverter units IV1 and IV2 in response to the recognized charging mode. For example, in the high speed charge mode, the control unit 250 may adjust the frequency so that high resonant current is applied to the working coil in response to the switching operation of the inverter unit.

The charging mode of the target object may be input by the user through the input interface 350.

Thus, the induction heating and wireless power transferring device 1 according to an exemplary implementation of this application may have the above-described features and configurations.

Hereinafter, the target object detecting method will be described based on the above-described features and configurations of the induction heating and wireless power transferring device 1.

Figure 3:
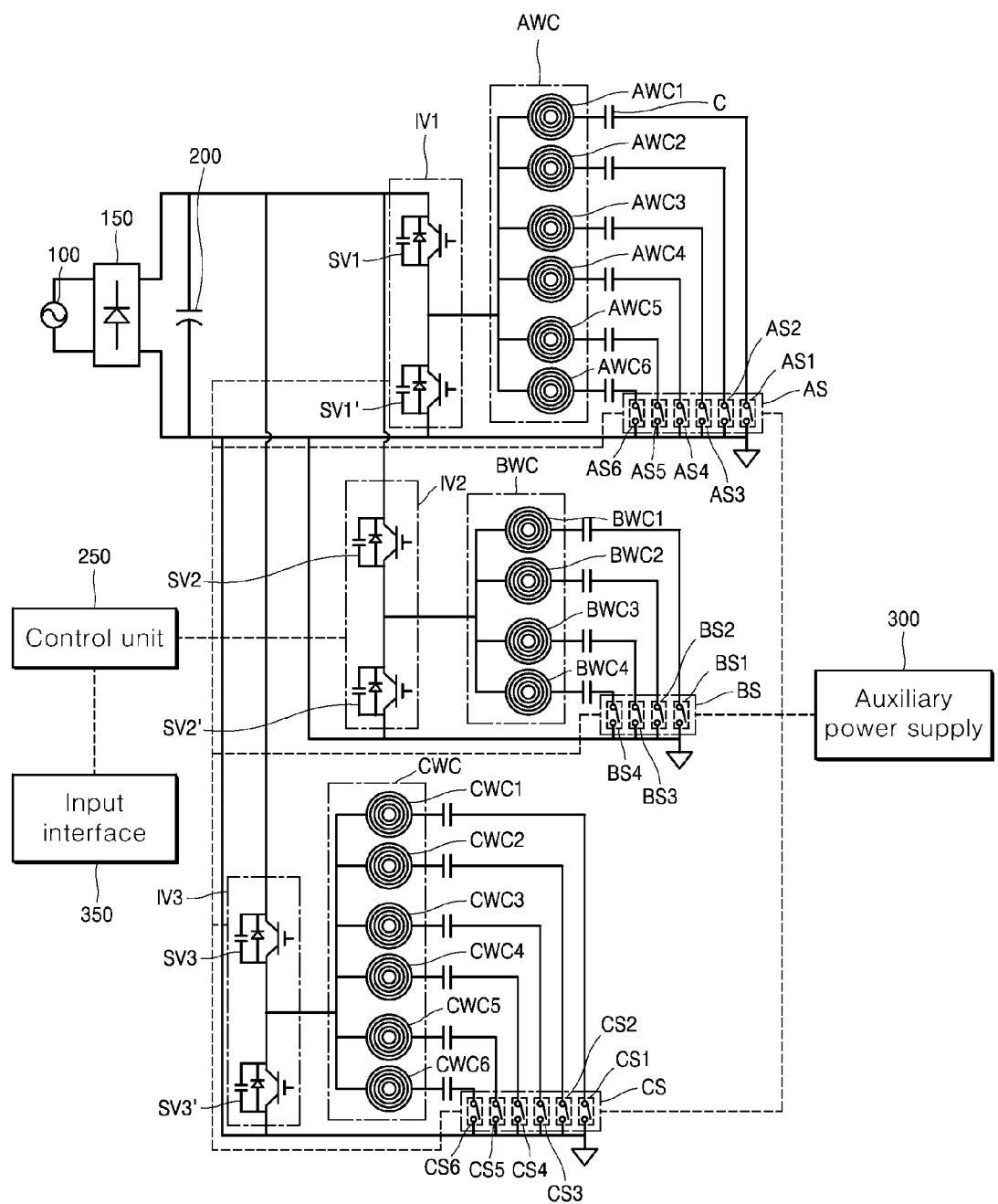
FIG. 3 is a diagram illustrating an example circuit to detect a target object by the induction heating and wireless power transferring device of FIG. 2.

FIG. 3 illustrates an example circuit to detect a target object by the induction heating and wireless power transferring device of FIG. 2. In some implementations, the induction heating and wireless power transferring device of FIG. 3 can be the induction heating and wireless power transferring device of FIG. 2. However, in some other implementations, modifications or variations can be made to the induction heating and wireless power transferring device of FIG. 3 to implement the induction heating and wireless power transferring device of FIG. 2.

Firstly, referring to FIG. 3, an induction heating and wireless power transferring device 1 according to an exemplary implementation of this application may include a power supply unit 100, a rectification unit 150, a DC link capacitor 200, first to third inverter units IV1-IV3, first to third working coil units AWC, BWC and CWC, first to third semiconductor switch units AS, BS and CS, a control unit 250, an auxiliary power supply 300, and an input interface 350.

In some implementations, the numbers of the inverter units, the working coil units, the working coils, the semiconductor switch units, and the semiconductor switches are not limited to the number illustrated in FIG. 3, and may be changed.

Figure 4:
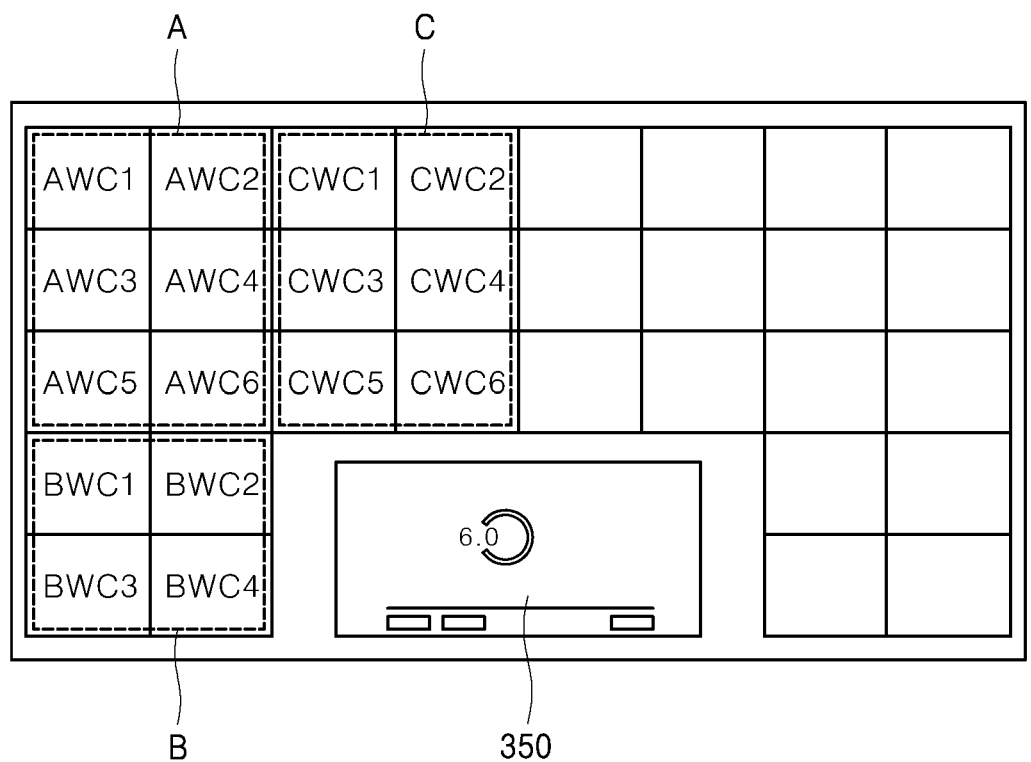
FIG. 4 is a diagram illustrating an example arrangement of the working coil of FIG. 3.

FIG. 4 illustrates an example arrangement of the working coil of FIG. 3. With reference to FIG. 4, the working coils in FIG. 3 are arranged at a half of an entire region (a zone free region). In order to arrange working coils at the other half of the entire region, the induction heating and wireless power transferring device in FIG. 3 may further include one or more additional elements such as an inverter unit, a working coil unit, a semiconductor switch unit, and a semiconductor switch.

But, for ease of explanation, the inverter unit, working coil unit, working coil, semiconductor switch unit, and semiconductor switch of FIG. 3 will be described as an example in exemplary implementations of this application.

Referring back to FIG. 3, the power supply unit 100 may output AC power and supply the AC power to the rectification unit 150, and the rectification unit 150 may convert the AC power supplied from the power supply unit 100 into DC power and supply the DC power to the DC link capacitor 200.

Here, the DC link capacitor 200 may be connected in parallel to the rectification unit 150.

Specifically, the DC link capacitor 200 may be connected in parallel to the rectification unit 150 to receive a DC voltage from the rectification unit 150. Also, the DC link capacitor 200 may be, for example, a smoothing capacitor, thereby reducing ripple of the supplied DC voltage.

In some implementations, the DC link capacitor 200 may receive a DC voltage from the rectification unit 150. The DC voltage may be applied to one end of the DC link capacitor 200, and the other end of the DC link capacitor 200 may be grounded by a potential difference between one end and the other end of the DC link capacitor 200.

Also, DC power (or a DC voltage) that is rectified by the rectification unit 150 and has ripple reduced by the DC link capacitor 200 may be supplied to at least one of the first to third inverter units IV1-IV3.

The first inverter unit IV1 may include two switching elements SV1 and SV1', the second inverter unit IV2 may include two switching elements SV2 and SV2', and the third inverter unit IV3 may include two switching elements SV3 and SV3'.

Also, the switching elements included in the respective inverter units IV1-IV3 may be alternately turned on and off by a switching signal supplied from the control unit 250 to convert the DC power into a high-frequency AC (i.e., a resonant current), and the converted high-frequency AC may be supplied to a working coil.

For example, a resonant current converted by the switching operation of the first inverter unit IV1 may be supplied to the first working coil unit AWC, and a resonant current converted by the switching operation of the second inverter unit IV2 may be supplied to the second working coil unit BWC. Also, a resonant current converted by the switching operation of the third inverter unit IV3 may be supplied to the third working coil unit CWC.

A resonant current generated by the first inverter unit IV1 may be applied to at least one of the working coils AWC1-AWC6 included in the first working coil unit AWC, and a resonant current generated by the second inverter unit IV2 may be applied to at least one of the working coils BWC1-BWC4 included in the second working coil unit BWC. Also, a resonant current generated by the third inverter unit IV3 may be applied to at least one of the working coils CWC1-CWC6 included in the third working coil unit CWC.

Here, the working coils AWC1-AWC6 included in the first working coil unit AWC may be connected in parallel to one another, and the working coils BWC1-BWC4 included in the second working coil unit BWC may be also connected in parallel to one another. Also, the working coils CWC1-CWC6 included in the third working coil unit CWC may be connected in parallel to one another.

With reference to FIG. 4, the working coils AWC1-AWC6 included in the first working coil unit AWC may be grouped and disposed in a region A, and the working coils BWC1-BWC4 included in the second working coil unit BWC may be grouped and disposed in a region B. Also, the working coils CWC1-CWC6 included in the third working coil unit CWC may be grouped and disposed in a region C.

The working coils may be also disposed in the other empty space, and the input interface 350 may be also disposed at a location other than the location illustrated in FIG. 4.

Referring back to FIG. 3, the first semiconductor switch unit AS may be connected to the first working coil unit AWC, the second semiconductor switch unit BS may be connected to the second working coil unit BWC, and the third semiconductor switch unit CS may be connected to the third working coil unit CWC.

Specifically, the first semiconductor switch unit AS may include six semiconductor switches AS1-AS6, and the six semiconductor switches AS1-AS6 may be respectively connected to the six working coils AWC1-AWC6 included in the first working coil unit AWC to respectively turn on or off the six working coils AWC1-AWC6.

Here, respective one ends of the six semiconductor switches AS1-AS6 may be respectively connected to the six working coils AWC1-AWC6, and the respective other ends of the six semiconductor switches AS1-AS6 may be connected to the other end (e.g., a ground terminal) of the DC link capacitor 200.

Further, the second semiconductor switch unit BS may include four semiconductor switches BS1-BS4, and the four semiconductor switches BS1-BS4 may be respectively connected to the four working coils BWC1-BWC4 included in the second working coil unit BWC to turn on or off the four working coils BWC1-BWC4, respectively.

Here, respective one ends of the four semiconductor switches BS1-BS4 may be respectively connected to the four working coils BWC1-BWC4, and the respective other ends of the four semiconductor switches BS1-BS4 may be connected to the other end (i.e., a ground terminal) of the DC link capacitor 200.

Further, the third semiconductor switch unit CS may include six semiconductor switches CS1 to CS6, and the six semiconductor switches CS1 to CS6 may be respectively connected to the six working coils CWC1-CWC6 included in the third working coil unit CWC to turn on or off the six working coils CWC1-CWC6, respectively.

Here, respective one ends of the six semiconductor switches CS1 to CS6 may be respectively connected to the six working coils CWC1-CWC6, and the respective other ends of the six semiconductor switches CS1 to CS6 may be connected to the other end (i.e., a ground terminal) of the DC link capacitor 200.

That is, the other ends of all semiconductor switches of the first to third semiconductor switch units AS, BS and CS may be connected to the other end (i.e., a ground terminal) of the DC link capacitor 200. As a result, the auxiliary power supply 300 may supply power to all semiconductor switches through one output terminal.

In some implementations, when the semiconductor switch is connected between the inverter unit and the working coil unit, emitters of the respective semiconductor switches are floated with respect to one other, and accordingly the number of output terminals of the auxiliary power supply 300 may increase by the number of the semiconductor switches. As a result, the number of pins of the auxiliary power supply 300 may also increase, leading to an increase in the volume of the circuit.

On the other hand, as in one exemplary implementation of this application, when all semiconductor switches are connected to the ground terminal (i.e., the other end of the DC link capacitor 200), the emitters of the semiconductor switches may be all common without being floated. Therefore, the auxiliary power supply 300 may supply power to all semiconductor switches through one output terminal. Also, the number of pins of the auxiliary power supply 300 may be reduced in comparison to a case where the emitter of the semiconductor switch is floated, and further, the volume of the circuit may be also reduced.

The other ends of all semiconductor switches may be connected to one end of the DC link capacitor 200 (i.e., a portion to which a DC voltage is applied). Also, when the single output capacity of the auxiliary power supply 300 is too large (i.e., when the single output capacity is significantly out of a predetermined reference capacity), the other ends of the semiconductor switches included in some semiconductor switch units may be connected to the other end (i.e., the ground terminal) of the DC link capacitor 200, and the other ends of the semiconductor switches included in the other semiconductor switch units may be connected to one end of the DC link capacitor 200 (i.e., a portion to which a DC voltage is applied).

But, for ease of explanation, a configuration in which all semiconductor switches are connected to the ground terminal (i.e., the other end of the DC link capacitor 200) will be described as an example in one exemplary implementation of this application.

In some implementations, the induction heating and wireless power transferring device 1 may further include a resonant capacitor (for example, C) connected between the working coil and the semiconductor switch.

When a voltage is applied by the switching operation of the inverter unit (for example, the first inverter unit IV1), the resonant capacitor C may begin to resonate. Further, when the resonant capacitor C resonates, a current flowing through the working coil (for example, AWC1) connected to the resonant capacitor C may rise.

Through such a process, an eddy current may be induced to a target object that is disposed on the working coil AWC1 connected to the corresponding resonant capacitor C.

The control unit 250 may control respective operations of the first to third inverter units IV1-IV3 and the first to third semiconductor switch units AS, BS and CS.

That is, the control unit 250 may supply a switching signal to control the operations of the respective inverter units IV1-IV3 and may supply a control signal to control the respective semiconductor switches AS1-AS6, BS1-BS4 and CS1 to CS6.

Further, the control unit 250 may detect a resonant current flowing through at least one of the working coils AWC1-AWC6, BWC1-BWC4 and CWC1-CWC6 included in the first to third working coil units AWC, BWC and CWC, and may determine a working coil with a target object located thereon based on the detected value.

That is, the control unit 250 may control the respective operations of the semiconductor switches AS1-AS6, BS1-BS4 and CS1 to CS6 included in the first to third inverter units IV1-IV3 and the first to third semiconductor switch units AS, BS and CS to detect a working coil with a target object located thereon among the working coils AWC1-AWC6, BWC1-BWC4 and CWC1-CWC6 included in the first to third working coil units AWC, BWC and CWC at a time point when the resonant current becomes zero.

Figure 5:
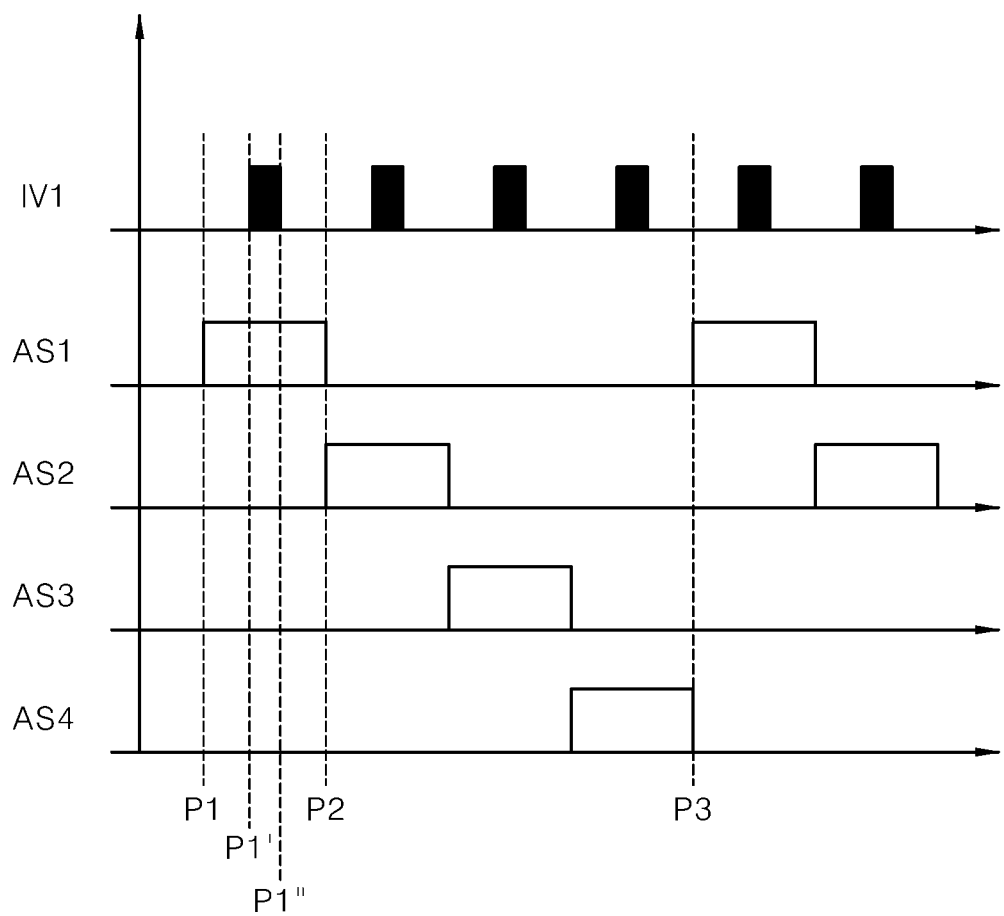
FIGS. 5 to 7 are diagrams illustrating a first example method to detect a target object by the induction heating and wireless power transferring device of FIG. 3.
Figure 6:
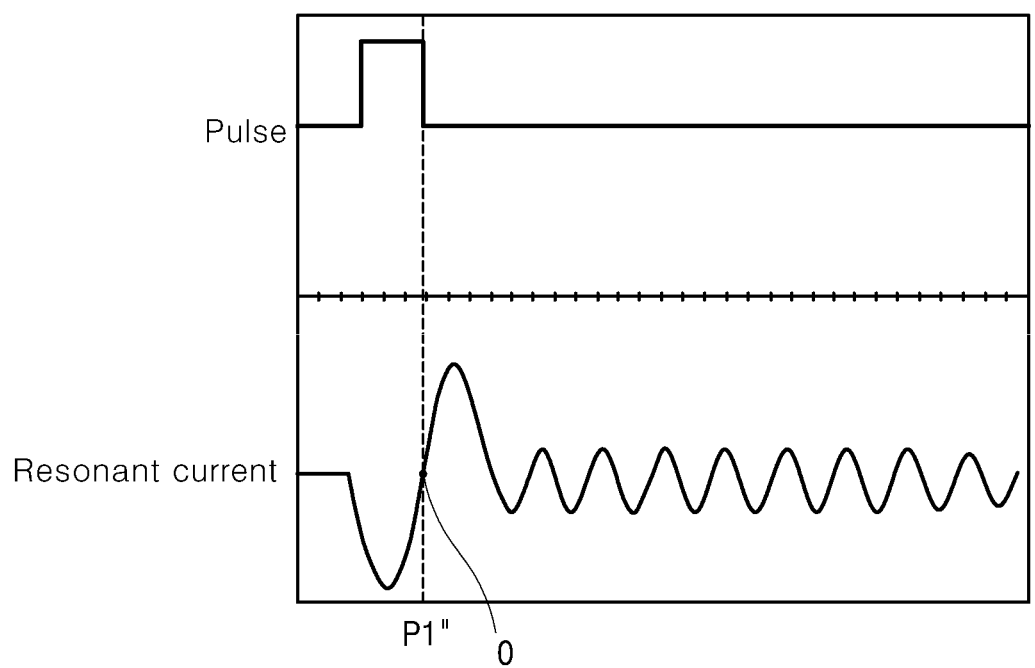
Figure 7:
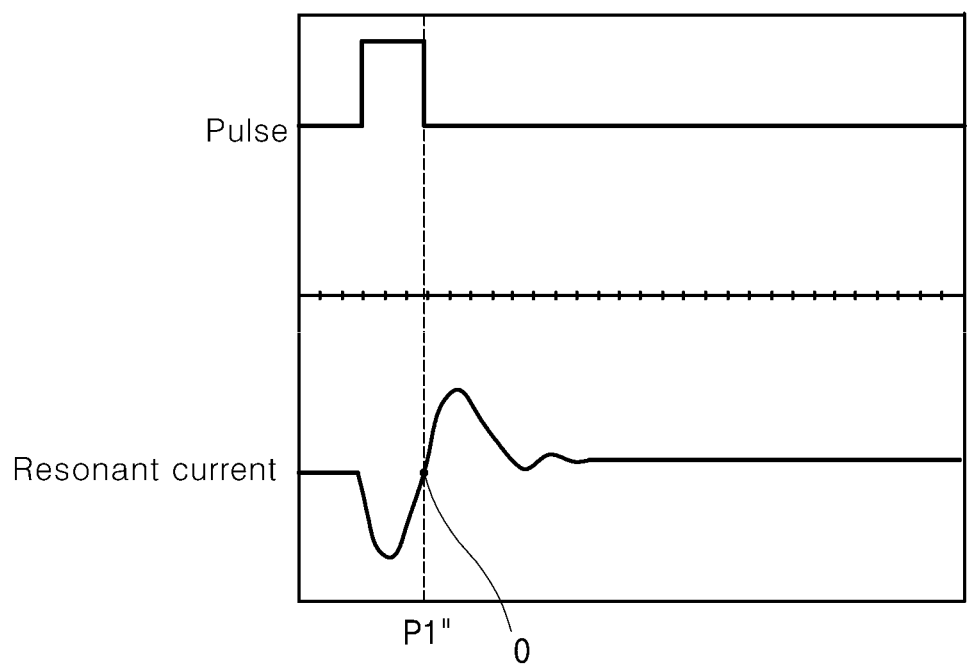

FIGS. 5 to 7 illustrate a first example method to detect a target object by the induction heating and wireless power transferring device of FIG. 3. For ease of explanation, a process of detecting a target object in the region A (A of FIG. 4) where the first working coil unit AWC is disposed will be described as an example, assuming that the first working coil unit AWC includes four working coils and the first semiconductor switch unit AS includes four semiconductor switches AS1-AS4 that are respectively connected to the four working coils.

Referring to FIGS. 3 and 5, the control unit 250 may supply N pulses (here, N is any one of 1, 2, or 3, and when N is 1, a one pulse shot is supplied to the first inverter unit IV1 as a switching signal) to the first inverter IV1 at each time point when a resonant current becomes zero to detect a location of the target object.

Every time the N pulses are supplied from the control unit 250, the first inverter unit IV1 may be turned on and off accordingly. As a result, free resonance may occur in a circuit including the first working coil unit AWC.

Here, when the control unit 250 supplies continuous pulses (e.g., four or more pulses) instead of the N pulses only for detection of the target object, a problem may occur in standby power. Thus, only the N pulses may be cyclically supplied to the first inverter unit IV1.

Hereinafter, for ease of explanation, a case where the N pulses are one pulse (i.e., a single pulse) will be described as an example.

The control unit 250 may sequentially turn on or off the four semiconductor switches AS1-AS4 in line with each single pulse before a location of the target object is detected.

That is, the control unit 250 may turn on the first semiconductor switch AS1 at a first time point P1, and then supply a single pulse to the first inverter unit IV1 at a time point when the resonant current (that is, the resonant current converted from the first inverter unit IV1) becomes zero.

Here, as illustrated in FIGS. 6 and 7, the control unit 250 may supply a single pulse in line with a time point P1" when the resonant current converted from the first inverter unit IV1 becomes zero (for example, a zero crossing time point of the resonant current). The time point when the single pulse is supplied may differ from the time point when the resonant current becomes zero within an error range.

FIG. 6 illustrates an example waveform of resonant current when a target object is not located on a working coil, from which, it can be seen that the absence of the target object causes no significant change in an attenuation width of the resonant current.

FIG. 7 illustrates an example waveform of resonant current when a target object is located on a working coil, from which, it can be seen that an attenuation width of the resonant current is larger than that of FIG. 6 due to the presence of the target object.

Referring back to FIGS. 3 and 5, a first delay during a certain period of time P1 to P1' until a single pulse is supplied to the first inverter unit IV1 after the first semiconductor switch AS1 is turned on may occur. Here, the reason for having a first delay elapsed time is that a certain period of time is required for the first semiconductor switch AS1 to be stabilized after being turned on.

Subsequently, after the single pulse is supplied to the first inverter unit IV1, a second delay during a certain period of time P1" to P2 may elapse again. Here, the reason for having a second delay elapsed time is that a certain period of time is required to perform a signal processing operation and a target object detecting operation for the single pulse supplied to the first inverter unit IV1.

When the target object is not detected before a second time point P2 when a predetermined cycle (for example, a predetermined cycle can represent a time period required for the semiconductor switch to be turned off after being turning on for the single pulse) has elapsed after the first time point P1, the control unit 250 may turn off the first semiconductor switch AS1 and turn on the second semiconductor switch AS2 at the second time point P2, and then supply the single pulse to the first inverter unit IV1 again at a time point when the resonant current becomes zero.

In addition, the control unit 250 may sequentially repeat the above-described process for the third and fourth semiconductor switches AS3 and AS4 until the target object is detected.

But, when the target object is not detected before a third time point P3, the control unit 250 may repeat the above-described process by turning off the fourth semiconductor switch AS4 and turning on the first semiconductor switch AS1 at the third time point P3, and then supplying the single pulse to the first inverter unit IV1 again at a time point when the resonant current becomes zero.

In some implementations, when the single pulse is supplied to the first inverter unit IV1 after the first semiconductor switch AS1 is turned on, the resonant current may flow only through the first working coil AWC1, and the control unit 250 may detect an attenuation degree of the resonant current flowing through the first working coil AWC1 to detect whether or not the target object is located on the first working coil AWC1.

Additionally, when the target object is located on the first working coil AWC1, a resistance of the target object may increase a total resistance, resulting in an increase in the attenuation degree of the resonant current flowing through the first working coil AWC1.

That is, the control unit 250 may detect a change in the number of pulses (for example, a decrease in the number of pulses) or a change in a pulse width (for example, a decrease in a pulse width) resulting from the attenuation of the resonant current flowing through the first working coil AWC1, thereby detecting whether or not the target object is located on the first working coil AWC1.

The control unit 250 may detects the resonant current flowing through the first working coil AWC1, and may detect whether or not the target object is present on the first working coil AWC1 based on the detected value.

As described above, the control unit 250 may sequentially detect whether or not the target object is located for the second to fourth working coils AWC2 to AWC4, and may continuously repeat this process.

Further, the above-described target object detecting operation for the first working coil unit AWC may be also performed in the same manner for the second and third working coil units BWC and CWC.

Furthermore, the control unit 250 may control the respective operations of the first to third inverter units IV1-IV3 and the first to third semiconductor switch units AS, BS and CS to synchronize resonant currents that are respectively converted by the first to third inverter units IV1-IV3 and detect a working coil with a target object located thereon at a time point when the synchronized resonant current becomes zero.

Specifically, for example, the control unit 250 may simultaneously detect whether or not the target object is located on the first working coil AWC1 of the first working coil unit AWC, the first working coil BWC1 of the second working coil unit BWC, and the first working coil CWC1 of the third working coil unit CWC at a time point when the resonant current becomes zero.

Thereafter, the control unit 250 may detect whether or not the target object is located on the second working coil AWC2 of the first working coil unit AWC, the second working coil BWC2 of the second working coil unit BWC and the second working coil CWC2 of the third working coil unit CWC at a time point when the resonant current becomes zero again.

In this manner, the control unit 250 may perform the target object detecting operation for all working coils within six cycles (i.e., a time when the resonant current is zero-crossed six times).

The control unit 250 may simultaneously perform the target object detecting operation not only for working coils corresponding to one half of the entire region (zone free region) illustrated in FIG. 3 but also for working coils corresponding to the other half.

Figure 8:
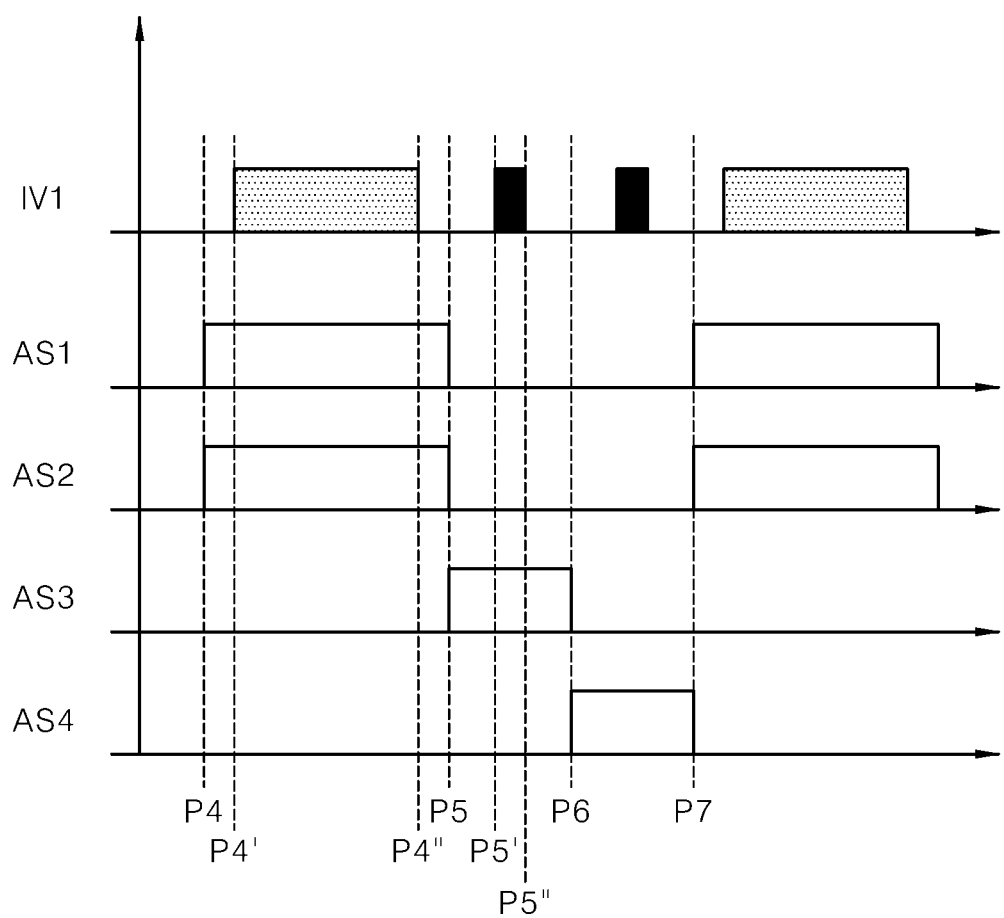
FIGS. 8 and 9 are diagrams illustrating a second example method to detect a target object by the induction heating and wireless power transferring device of FIG. 3.
Figure 9:
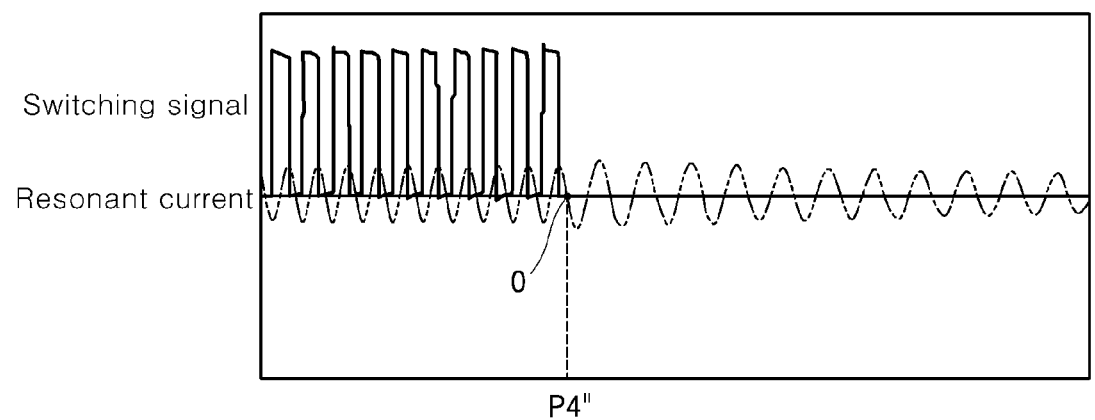

FIGS. 8 and 9 illustrate a second example method to detect a target object by the induction heating and wireless power transferring device of FIG. 3. Referring to FIGS. 3 and 8, when the target object is detected on the first and second working coils AWC1 and AWC2, the control unit 250 may turn on the first and second semiconductor switches AS1 and AS2 at a fourth time point P4, and then supply a switching signal whose frequency and phase are adjusted to correspond to a power level (i.e., a heating intensity or a power transferring amount) input from the user to the first inverter unit IV1.

As a result, the resonant current may be applied to the first and second working coils AWC1 and AWC2, and the target object located on the first and second working coils may be inductively heated or receive power in a wireless manner.

At this time, the control unit 250 may also supply the switching signal to the first inverter unit IV1 when a third delay during a certain period of time P4 to P4' has elapsed after the first and second semiconductor switches AS1 and AS2 are turned on. The reason for having a third delay elapsed time is that a certain period of time is required for the first and second semiconductor switches AS1 and AS2 to be stabilized after being turned on.

Also, the control unit 250 may continuously detect whether or not a target object other than the target object (i.e., the target object located on the first working coil AWC1 and the second working coil AWC2) is located on a working coil that is not driven (i.e., the third working coil AWC3 or the fourth working coil AWC4).

That is, the control unit 250 may stop supplying the switching signal to the first inverter unit IV1 to detect whether or not another object is located on the working coil that is not driven. In addition, the control unit 250 may determine whether or not the target object is still present on the first and second working coils AWC1 and AWC2 while stopping the supply of the switching signal to the first inverter unit IV1.

Specifically, the control unit 250 may stop supplying the switching signal to the first inverter unit IV1 at a time point (for example, P4") when the resonant current becomes zero, and may determine whether or not the target object remains on the first and second working coils AWC1 and AWC2 before the start of a predetermined period of time P5 to P7 (for example, a period of time that corresponds to the number of working coils that are not driven X a predetermined cycle) after stopping the supply of the switching signal.

FIG. 9 illustrates an example waveform of resonant current when a target object is removed or eccentric from an upper portion of the working coil. As illustrated in FIG. 9, the control unit 250 may stop supplying the switching signal in line with a time point P4" when a resonant current converted by the first inverter unit IV1 becomes zero (for example, a zero-crossing time point of the resonant current).

In addition, FIG. 9 shows that the removal or eccentricity of the target object causes no significant change in the attenuation width of the resonant current.

When the target object remains on the working coil, the attenuation width of the resonant current may be large due to the presence of the target object, unlike FIG. 9.

Referring back to FIGS. 3 and 8, when a fourth delay during a certain period of time P4" to P5 has elapsed after stopping the supply of the switching signal, the control unit 250 may turn off the first and second semiconductor switches AS1 and AS2 and turn on the third semiconductor switch AS3. Then, the control unit 250 may supply a single pulse to the first inverter unit IV1 at a time point when the resonant current becomes zero within a predetermined period of time.

Here, the reason for having a fourth delay elapsed time is that a certain period of time is required to perform a signal processing operation and a target object detecting operation for the switching signal supplied to the first inverter unit IV1.

For the same reason as described above, when the control unit 250 supplies a single pulse to the first inverter unit IV1 within a predetermined period of time P5 to P7, the control unit 250 may have a delay during a period of time of P5 to P5' and P5" to P6 before and after a time point of supplying the single pulse.

Thereafter, the control unit 250 may sequentially turn on or off the third and fourth semiconductor switches AS3 and AS4 at a predetermined cycle in the same manner as the above-described method in order to detect another target object.

Also, when another target object is not detected on the third working coil AWC3 or the fourth working coil AWC4 before the predetermined period of time P5 to P7 ends, the control unit 250 may turn off the fourth semiconductor switch AS4 and turn on the first and second semiconductor switches AS1 and AS2 simultaneously with the end of the predetermined period of time (i.e., a seventh time point P7). Then, the control unit 250 may supply the above-described switching signal to the first inverter unit IV1 again.

In some implementations, with reference to FIG. 6, the third semiconductor switch AS3 is already turned off at a sixth time point P6, and a single pulse may be supplied to the first inverter unit IV1 at a time point when the resonant current becomes zero within the predetermined period of time P5 to P7 (here, P6 to P7 because it comes after the sixth time point P6) after the fourth semiconductor switch AS4 is turned on, thereby detecting whether or not another target object is present on the fourth working coil AWC4. Also, the switching signal that is supplied to the first inverter unit IV1 after a seventh time point P7 may be a switching signal whose frequency and phase are adjusted to correspond to the power level input from the user.

Thus, even after a target object is detected, the control unit 250 may continuously detect whether or not another target object is located on a working coil that is not driven.

The above-described target object detecting operation for the first working coil unit AWC may be also performed in the same manner for the second and third working coil units BWC and CWC.

Further, the control unit 250 may control the respective operations of the first to third inverter units IV1-IV3 and the first to third semiconductor switch units AS, BS and CS to synchronize resonant currents that are respectively converted by the first to third inverter units IV1-IV3 and detect a working coil with a target object located thereon at a time point when the synchronized resonant current becomes zero.

In this manner, the control unit 250 may simultaneously perform the target object detecting operation for the first to third working coil units AWC, BWC and CWC at each time point when a resonant current becomes zero. The control unit 250 may simultaneously perform the target object detecting operation not only for working coils corresponding to one half of the entire region (zone free region) illustrated in FIG. 3 but also for working coils corresponding to the other half.

Figure 10:
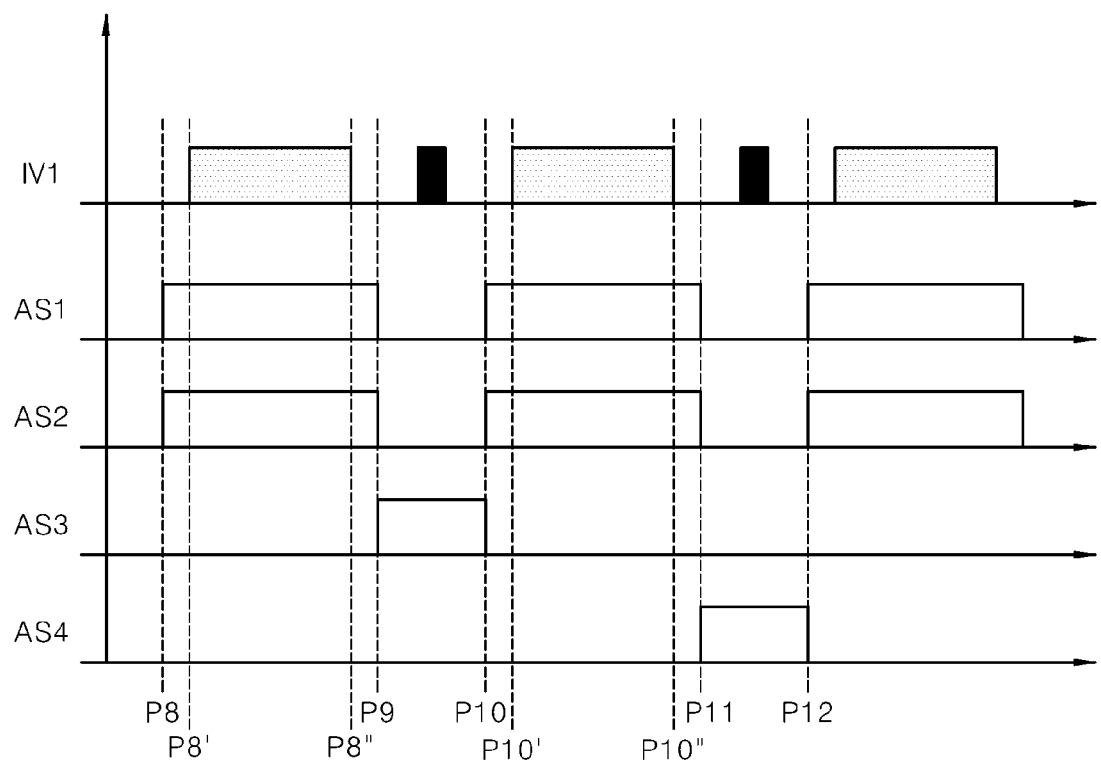
FIG. 10 is a diagram illustrating a third example method to detect a target object by the induction heating and wireless power transferring device of FIG. 3.

FIG. 10 illustrates a third example method to detect a target object by the induction heating and wireless power transferring device of FIG. 3. In some implementations, the third example method described with respect to FIG. 10 can be the same as or similar to the second example method described with respect to FIG. 8 except some differences described below.

Referring to FIGS. 3 and 10, unlike the example described with reference to FIG. 8, the control unit 250 may turn off the first and second semiconductor switches AS1 and AS2 and turn on the third semiconductor switch AS3 simultaneously with the start of a predetermined period of time P9 to P10 (for example, a period of time that corresponds to a predetermined cycle for a single pulse) when a fifth delay during a certain period of time P8" to P9 has elapsed after stopping the supply of the switching signal. Then, the control unit 250 may supply a single pulse to the first inverter unit IV1 at a time point when the resonant current becomes zero within the predetermined period of time P9 to P10.

Thereafter, when another object is not detected on the third working coil AWC3 before the predetermined period of time (for example, P9 to P10) ends, the control unit 250 may turn off the third semiconductor switch AS3 and turn on the first and second semiconductor switches AS1 and AS2 simultaneously with the end of the predetermined period of time (i.e., a tenth time point P10). Then, the control unit 250 may supply the above-described switching signal to the first inverter unit IV1 again.

That is, unlike the example described with reference to unlike FIG. 8, the control unit 250 may detect whether or not another object is located on the third working coil AWC3, and then drive the first and second working coils AWC1 and AWC2 again.

Thereafter, when the same period of time as a period of time from an eighth' time point P8' to an eighth" time point P8" (i.e., a period of time from a tenth' time point P10' to a tenth" time point P10") has elapsed, the control unit 250 may stop supplying the switching signal.

Thereafter, when a sixth delay during a certain period of time P10" to P11 has elapsed, the control unit 250 may turn off the first and second semiconductor switches AS1 and AS2 again and turn on the fourth semiconductor switch AS4 simultaneously with the start of a predetermined period of time P11 to P12 (i.e., the same period of time as the above-described period of time P9 to P10). Then, the control unit 250 may supply a single pulse to the first inverter unit IV1 at a time point when the resonant current becomes zero within the predetermined time period P11 to P12, thereby detecting whether or not another object is located on the fourth working coil AWC4.

Thus, even after a target object is detected, the control unit 250 may continuously detect whether or not another object is located on a working coil that is not driven in a different manner from that of FIG. 8.

The above-described target object detecting operation for the first working coil unit AWC may be also performed in the same manner for the second and third working coil units BWC and CWC.

As described above, the induction heating and wireless power transferring device 1 according to an exemplary implementation of this application may independently distinguish the plurality of working coils AWC1-AWC6, BWC1-BWC4 and CWC1-CWC6 from one another through the semiconductor switches AS1-AS6, BS1-BS4 and CS1 to CS6 and the control unit 250, and may turn on or off the plurality of working coils AWC1-AWC6, BWC1-BWC4 and CWC1-CWC6 at high speed, thereby improving target object detection speed and algorithm. Further, the induction heating and wireless power transferring device 1 may perform the target object detecting operation at a time point when the resonant current becomes zero, thereby minimizing an influence of the target object detecting operation on an output of the device. Furthermore, the induction heating and wireless power transferring device 1 may continuously perform the target object detecting operation not only before the working coil is driven by the inverter unit but also during the driving of the working coil, thereby improving target object detection reliability.

Also, the induction heating and wireless power transferring device 1 according to an exemplary implementation of this application may perform the target object detecting operation by using the semiconductor switch and the control unit instead of the relay and the target object detection circuit, thereby solving a noise problem occurring when the switching operation of the relay is performed. As a result, it is possible to improve user satisfaction. Further, the induction heating and wireless power transferring device 1 may improve ease of use because the user may use the induction heating and wireless power transferring device 1 quietly during noise-sensitive time zones (for example, at dawn or late at night). In addition, the induction heating and wireless power transferring device 1 may reduce the volume of the circuit by removing the relay and the target object detection circuit that occupies a large portion of the area of the circuit, thereby reducing the overall volume of the induction heating and wireless power transferring device 1. As a result, it is possible to improve space utilization.

Since various substitutions, changes, and modifications can be made within the scope that does not deviate the technical idea of this application for those skilled in the art to which this application pertains, this above-mentioned application is not limited by the above-mentioned implementations and the accompanying drawings.

What is claimed is:

1. An induction heating and wireless power transferring device comprising:
    a first plurality of working coils comprising a first working coil and a second working coil that are electrically connected in parallel;
    a rectifier that is configured to rectify alternating current (AC) power supplied from a power supply unit to direct current (DC) power;
    a first inverter that is configured to (i) receive the DC power from the rectifier, (ii) convert the DC power into a first resonant current, and (iii) apply the first resonant current to at least one of the first working coil or the second working coil;
    a first switch that is coupled to the first working coil and that is configured to turn on or off the first working coil;
    a second switch that is coupled to the second working coil and that is configured to turn on or off the second working coil; and
    a controller that is configured to:
        control at least one of the first inverter, the first switch, or the second switch,
        supply a pulse to the first inverter based on the first resonant current becoming zero,
        detect whether a target object is located on the first working coil or the second working coil based on a change of the first resonant current in response to the pulse,
        supply a switching signal to the first inverter based on the target object being detected on the first working coil,
        turn on or off the first switch based on the switching signal,
        stop supplying the switching signal to the first inverter at a time point at which the first resonant current becomes zero,
        determine whether the target object remains on the first working coil before a start of a predetermined time period after stopping the supply of the switching signal,
        turn off the first switch and turn on the second switch at the start of the predetermined time period, and
        supply the pulse to the first inverter based on the first resonant current becoming zero during the predetermined time period.

2. The induction heating and wireless power transferring device of claim 1, wherein the controller is configured to:
    based on the first resonant current becoming zero at one or more time points, supply one or more pulses to the first inverter at the one or more time points to thereby detect whether the target object is located on the first working coil or the second working coil.

3. The induction heating and wireless power transferring device of claim 2, wherein the controller is configured to:
    turn on or off the first switch or the second switch sequentially and repeatedly until detection of whether the target object is located on the first working coil or the second working coil is complete.

4. The induction heating and wireless power transferring device of claim 3, wherein the controller is configured to supply the one or more pulses while the first switch or the second switch is turned on.

5. The induction heating and wireless power transferring device of claim 1, wherein the controller is configured to:
    turn on the first switch at a first time point, and
    supply a first pulse to the first inverter based on the first resonant current becoming zero after the first time point,
    in a state in which a target object is not detected before a second time point that is a predetermined cycle after the first time point, turn off the first switch and turn on the second switch at the second time point, and
    supply a second pulse to the first inverter based on the first resonant current becoming zero after the second time point.

6. The induction heating and wireless power transferring device of claim 5, wherein the controller is configured to:
    at a third time point and based on a determination that the target object is not detected before the third time point, turn off the second switch and turn on the first switch, the third time point being the predetermined cycle after the second time point, and
    supply a third pulse to the first inverter based on the first resonant current becoming zero after the third time point.

7. The induction heating and wireless power transferring device of claim 1,
    wherein a frequency and a phase of the switching signal are adjusted based on power level input received from a user.

8. The induction heating and wireless power transferring device of claim 7, wherein the
    predetermined time period is set as a period for detecting whether another target object other than the target object is located on the second working coil.

9. The induction heating and wireless power transferring device of claim 8, wherein the controller is configured to:
    turn off the first switch and turn on the second switch simultaneously.

10. The induction heating and wireless power transferring device of claim 8, wherein the controller is configured to:
    based on another target object not being detected on the second working coil during the predetermined time period, turn off the second switch and turn on the first switch at an end of the predetermined time period, and supply the switching signal to the first inverter.

11. The induction heating and wireless power transferring device of claim 1, wherein the controller is configured to:
    detect an attenuation degree of resonant current flowing through at least one of the first working coil or the second working coil, and
    based on the detected attenuation degree of the first resonant current, determine whether the target object is located on the first working coil or the second working coil.

12. The induction heating and wireless power transferring device of claim 1, wherein the first switch is a semiconductor switch.

13. The induction heating and wireless power transferring device of claim 1, wherein the second switch is a semiconductor switch.

14. The induction heating and wireless power transferring device of claim 1, further comprising:

a filter configured to remove an AC component of the DC power received from the rectifier.

15. The induction heating and wireless power transferring device of claim 14, wherein the filter includes one or more capacitors.

16. An induction heating and wireless power transferring device comprising:
a first plurality of working coils comprising a first working coil and a second working coil that are electrically connected in parallel;
a rectifier that is configured to rectify alternating current (AC) power supplied from a power supply unit to direct current (DC) power;
a first inverter that is configured to (i) receive the DC power from the rectifier, (ii) convert the DC power into a first resonant current, and (iii) apply the first resonant current to at least one of the first working coil or the second working coil;
a first switch that is coupled to the first working coil and that is configured to turn on or off the first working coil;
a second switch that is coupled to the second working coil and that is configured to turn on or off the second working coil;
a controller that is configured to:
control at least one of the first inverter, the first switch, or the second switch,
supply a pulse to the first inverter based on the first resonant current becoming zero, and
detect whether a target object is located on the first working coil or the second working coil based on a change of the first resonant current in response to the pulse;
a second plurality of working coils comprising a third working coil and a fourth working coil that are electrically connected in parallel;
a second inverter that is configured to (i) receive the DC power from the rectifier, (ii) convert the DC power into a second resonant current, and (iii) apply the second resonant current to at least one of the third working coil or the fourth working coil;
a third switch that is coupled to the third working coil and that is configured to turn on or off the third working coil; and
a fourth switch that is coupled to the fourth working coil and that is configured to turn on or off the fourth working coil,
wherein the controller is configured to:
control at least one of the first inverter, the second inverter, the first switch, the second switch, the third switch, or the fourth switch to synchronize the first resonant current converted by the first inverter and the second resonant current converted by the second inverter, and
control at least one of the first inverter, the second inverter, the first switch, the second switch, the third switch, or the fourth switch to detect whether a target object is located on the first working coil, the second working coil, the third working coil, or the fourth working coil based on the synchronized resonant current becoming zero.

17. The induction heating and wireless power transferring device of claim 16, wherein the controller is configured to:
turn on the first switch and the third switch at a first time point,
supply respective first pulses to the first inverter and the second inverter based on the synchronized resonant current becoming zero after the first time point, and
at a second time point and based on the target object not being detected on the first working coil or the third working coil before the second time point that is a predetermined cycle after the first time point, turn off the first switch and the third switch and turn on the second switch and the fourth switch, and
supply respective second pulses to the first inverter and the second inverter based on the synchronized resonant current becoming zero.

18. The induction heating and wireless power transferring device of claim 17, wherein the controller is configured to:
at a third time point and based on the target object not being detected on the second working coil or the fourth working coil before the third time point, turn off the second switch and the fourth switch and turn on the first switch and the third switch, the third time point being the predetermined cycle after the second time point, and
supply respective third pulses to the first inverter and the second inverter based on the synchronized resonant current becoming zero after the third time point.

19. The induction heating and wireless power transferring device of claim 16, wherein the third switch is a semiconductor switch.

20. The induction heating and wireless power transferring device of claim 16, wherein the fourth switch is a semiconductor switch.

* * * * *